United States Patent
Lee et al.

(10) Patent No.: US 8,837,314 B2
(45) Date of Patent: Sep. 16, 2014

(54) CONNECTION TIMEOUT MANAGEMENT IN A COMMUNICATION NETWORK WITH NETWORK REDUNDANCY

(75) Inventors: Kenneth Lee, Cambridge, MA (US); Vijay Vallala, N. Andover, MA (US)

(73) Assignee: Schneider Electric Industries SAS, Rueil Malmaison (FR)

( * ) Notice: Subject to any disclaimer, the term of this patent is extended or adjusted under 35 U.S.C. 154(b) by 340 days.

(21) Appl. No.: 13/440,187

(22) Filed: Apr. 5, 2012

(65) Prior Publication Data

US 2013/0265888 A1 Oct. 10, 2013

(51) Int. Cl.
*H04J 3/14* (2006.01)
*H04L 1/18* (2006.01)
*H04L 12/26* (2006.01)

(52) U.S. Cl.
CPC .............. *H04L 1/188* (2013.01); *H04L 43/00* (2013.01)
USPC .......................................................... 370/252

(58) Field of Classification Search
CPC ....... H04L 1/1848; H04L 1/188; H04L 12/26; H04L 29/06993; H04L 43/00; H04L 43/0852; H04L 69/28
See application file for complete search history.

(56) References Cited

U.S. PATENT DOCUMENTS

| | | | | |
|---|---|---|---|---|
| 4,837,704 A * | 6/1989 | Lengefeld | ...................... | 700/216 |
| 6,901,081 B1 * | 5/2005 | Ludwig | ......................... | 370/519 |
| 2008/0232405 A1 * | 9/2008 | Gallo | ............................ | 370/498 |

* cited by examiner

*Primary Examiner* — Yong Zhou
(74) *Attorney, Agent, or Firm* — Lando & Anastasi, LLP

(57) ABSTRACT

A method of configuring a communication network including a network device includes obtaining a first parameter associated with a predetermined topological characteristic of the communication network, a second parameter associated with a communication protocol of the communication network and a third parameter associated with a performance characteristic of the communication network, and calculating a connection timeout value based on the first parameter, the second parameter and the third parameter. The network device is configured to determine whether a communication timeout has occurred on the communication network based on the connection timeout value. Calculating the connection timeout value may include calculating a sum of the first parameter, the second parameter and the third parameter.

20 Claims, 4 Drawing Sheets

CONNECTION TIMEOUT MANAGEMENT IN A COMMUNICATION NETWORK WITH NETWORK REDUNDANCY

BACKGROUND OF THE INVENTION

1. Field of Invention

Embodiments of the invention relate generally to configuration management techniques for communication networks, and more particularly, to systems and methods of connection timeout management.

2. Discussion of Related Art

A conventional communication network, such as an industrial automation network, includes at least one master device and at least one slave device. Each device communicates with other devices on the network through one or more virtual input/output (I/O) connections. Some conventional communication networks having network redundancy technologies, such as Rapid Spanning Tree Protocol (RSTP), require a non-zero amount of time to repair or reconverge from network disruptions, during which data packets are not guaranteed to reach their destinations. For example, RSTP may be configured to respond to physical link failures, such as those caused by cable or device failures, within a few milliseconds. Preferably, each device on the network should be able to tolerate or ignore network disruptions to avoid losing data, which could occur if network connections were closed prematurely.

In some conventional communication network communications protocols used in industrial automation applications, such as EtherNet/IP and Modbus TCP, each device has a timeout value associated with each I/O connection. The timeout value is a component of the network redundancy technology and may be used, at least in part, to detect and recover from lost or disrupted I/O connections. If the timeout value is too small, then the I/O connection may be terminated prematurely, the health of the connection may be incorrectly identified as bad, and/or it may take a significant amount of time for the connection to be restored. This may result in the device performing in an unexpected and/or undesirable manner during the timeout period. If the timeout value is too large, recovery from network disruptions may be delayed, negatively impacting communication speeds. Further, if the timeout value is too large, a communication problem that is not recoverable via the network redundancy technology may not be detected as quickly as can be or should be, negatively impacting the overall performance and behavior of the system. Typically, a trial-and-error technique has been used for adjusting the timeout value so that it is neither too large nor too small; however, such an approach is not optimal and is imprecise and inefficient.

SUMMARY OF THE INVENTION

One aspect of the invention is directed to a method of configuring a communication network including a network device. The method includes obtaining, by a configuration device operatively coupled to the network device, a first parameter associated with a predetermined topological characteristic of the communication network, obtaining, by the configuration device, a second parameter associated with a communication protocol of the communication network, obtaining, by the configuration device, a third parameter associated with a performance characteristic of the communication network, calculating, by the configuration device, a connection timeout value based on the first parameter, the second parameter and the third parameter, and programming the network device with the connection timeout value using the configuration device. The network device is configured to determine whether a communication timeout has occurred on the communication network based on the connection timeout value.

In the method, calculating the connection timeout value may include calculating a sum of the first parameter, the second parameter and the third parameter. The first parameter may include a predetermined worst-case network recovery time of the communication network, and in one example is equal to 50 milliseconds. The second parameter may include a maximum data packet time interval of the communication network, and may include one of a requested packet interval and an actual packet interval. The network device may be a master network device, and the third parameter may include a worst-case communication latency between the master network device and a slave network device operatively coupled to the master network device through the communication network. The third parameter may include a combination of a queuing delay time of the communication network, a propagation delay time of the communication network and a processing delay time of the communication network. The method may further include programming the master network device to establish at least one I/O connection, using the connection timeout value, with a slave network device operatively coupled to the master network device through the communication network.

Another aspect of the invention is directed to a network management system. The network management system includes a network device configured to be operatively coupled to a communication network, and a configuration device operatively coupled to the network device. The configuration device is configured to obtain a first parameter associated with a predetermined topological characteristic of the communication network, obtain a second parameter associated with a communication protocol of the communication network, obtain a third parameter associated with a performance characteristic of the communication network, calculate a connection timeout value based on the first parameter, the second parameter and the third parameter, and program the network device with the connection timeout value. The network device is configured to determine whether a communication timeout has occurred on the communication network based on the connection timeout value.

In the management system, the configuration device may be further configured to calculate the connection timeout value by calculating a sum of the first parameter, the second parameter and the third parameter. The first parameter may include a predetermined worst-case network recovery time of the communication network, and in one example may be equal to 50 milliseconds. The second parameter may include a maximum data packet time interval of the communication network, and may include one of a requested packet interval and an actual packet interval. The network device may be a master network device, and the third parameter may include a worst-case communication latency between the master network device and a slave network device operatively coupled to the master network device through the communication network. The third parameter may include a combination of a queuing delay time of the communication network, a propagation delay time of the communication network and a processing delay time of the communication network. The configuration device may be further configured to program the master network device to establish at least one I/O connection, using the connection timeout value, with a slave network device operatively coupled to the master network device through the communication network.

Yet another aspect of the invention is directed to a non-transitory computer readable medium having stored thereon sequences of instructions including instructions that will cause a processor to obtain a first parameter associated with a predetermined topological characteristic of the communication network, obtain a second parameter associated with a communication protocol of the communication network, obtain a third parameter associated with a performance characteristic of the communication network, calculate a connection timeout value based on the first parameter, the second parameter and the third parameter; and program a network device operatively coupled to the processor with the connection timeout value using the configuration device, The network device may be configured to determine whether a communication timeout has occurred on the communication network based on the connection timeout value.

The non-transitory computer readable medium may further include an instruction that will cause the processor to calculate the connection timeout value by calculating a sum of the first parameter, the second parameter and the third parameter.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
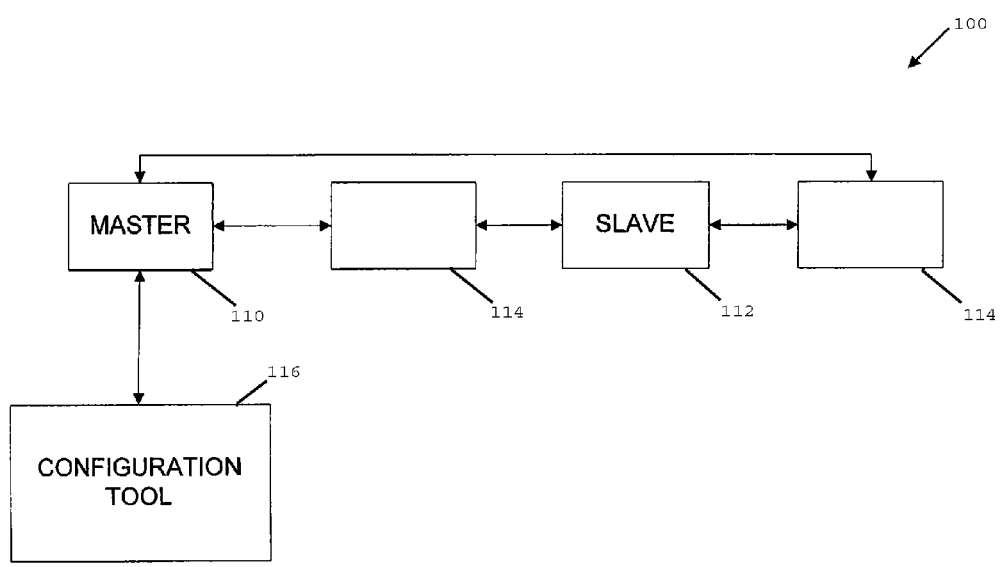
FIG. 1 is a block diagram of one example of a communication network in accordance with one embodiment.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As discussed above, devices in a communication network may use a configurable timeout value to detect and recover from communication disruptions on the network. Typically, in some prior techniques, the timeout value is determined using a trial-and-error approach based on some known and unknown parameters. Such an approach is inherently imprecise and may not lead to optimal results (i.e., the timeout value may be too large or too small, which, as discussed above, may lead to undesirable performance of the devices and the network).

According to one embodiment, several parameters, each of which may be either fixed or variable, are used to calculate a timeout value for a particular network configuration that permits devices in the network to detect and/or recover from communication disruptions in an optimal manner. The calculated timeout value is then provided to at least one device in the network (e.g., the timeout value is stored in a memory register of the device), which uses the timeout value to manage the operation of I/O connections with other networked devices.

FIG. 1 is a block diagram showing one example of a communication network 100, according to one embodiment. The network 100 may, for example, be configured as a redundant network (e.g., a mesh or ring network) using RSTP. The network 100 may, in some embodiments, include an industrial automation network. The industrial automation network may be configured to support various industrial automation protocols, such as CANopen, DeviceNet, EtherNet/IP, FIPIO, and Modbus. Multiple devices 110, 112, 114 are interconnected to form the network 100, including a master device 110 and at least one slave device 112. A configuration tool 116 may optionally be coupled to the master device 110. The configuration tool 116 may include, for example, programming and/or network configuration software that communicates directly with the master device 110, and indirectly with other devices 114, including the slave device 112, over the network 100. One example of a configuration tool 116 that may be used is the UNITYPRO™ PLC software development package sold by Schneider Electric S.A. of Rueil-Malmaison, France.

In one embodiment, the master device 110 can be programmed with a communication timeout value (not shown), such as described above. The timeout value may be used by the master device 110, for example, to detect and recover from any network disruptions that prevent data packets traveling through the network 100 from reaching their destinations along an active communication path. In a network with a redundant topology, there may be two or more paths between any two devices in the network. The active communication path may be, at any given time, any one of the possible paths through the network. For example, if a data packet fails to reach its destination via an open I/O connection between two devices (e.g., between the master device 110 and the slave device 112) along an active communication path within the time period defined by the communication timeout value, a timeout event is declared by one or more of the devices on the network 100. In response to the timeout event, the device that originally sent the data packet may attempt to resend the data packet using the existing I/O connection, or close the existing I/O connection and attempt to open a new I/O connection along a different path to resend the data packet.

In some embodiments, the timeout value may also be used by slave devices as well as the master device, with the master device configuring the slave devices with the timeout value. In this embodiment, both sides of a network connection can monitor the connection.

In one embodiment, the configuration tool 116 is configured to calculate the timeout value, although it will be understood that other techniques and tools may be employed for calculating the timeout value consistent with the approach described herein. In this embodiment, the timeout value is calculated according to the following equation:

$$T>=(R+P+D)$$

where T is the calculated timeout value, R is the network recovery time, P is maximum time period between sending or receiving subsequent data packets, and D is the latent communication delay between the master device 110 and the slave device 112 as a function of the physical network configuration. Each of the parameters R, P and D may be obtained from a source, such as a configuration data table stored in the memory of the configuration tool 116 or the master device 110, and/or one or more of the parameters may be manually entered into the configuration tool 116 by the user.

In one embodiment, the first parameter R represents the upper limit of the network recovery time (i.e., the worst case network recovery time), which may be a fixed, predetermined value. The first parameter R may be associated with, for example, the topology or a topological characteristic of the network 100 and/or the network redundancy technology (e.g., RSTP). For example, the first parameter R may be 50 milliseconds, It will be appreciated that the first parameter R may be any value corresponding to the predetermined or worst-case recovery time of the network 100.

The second parameter P is associated with the communication protocol of the network 100 and, in one embodiment, represents the maximum time period between any two I/O data packets traveling between any two devices (e.g., between the master device 110 and the slave device 112). The second parameter P may, for example, represent a retransmission timeout value; if a data packet does not arrive within the time P after the previous data packet is received, a timeout occurs and the packet may be resent. The second parameter P may be preset in the master device 110, and may be obtained by the configuration tool 116 by querying the master device 110. The mechanism by which the second parameter P is established may be based, for instance, on the protocol used in the network 100. For example, if the network 100 is an EtherNet/IP network, the second parameter P may be equal to the requested packet interval (RPI) or actual packet interval (API) associated with the I/O connection between the master device 110 and the slave device 112. In another example, if the network 100 is a Modbus TCP network, the second parameter P may be equal to the repetition rate of an I/O scanner associated with the master device 110 and/or the slave device 112.

The third parameter D is associated with a performance characteristic of the network and, in one embodiment, represents the worst-case physical latency of a data packet traveling between the master device 110 and the slave device 112. The latency may include a combination of queuing delays, propagation delays and/or any processing delays incurred by a data packet as it travels between the master device 110 and the slave device 112. The third parameter D may, for example, be obtained by manual entry into the configuration tool 116. Also, the tool could evaluate the physical topology, and based on its database of devices, obtain the corresponding worst case values.

Figure 2:
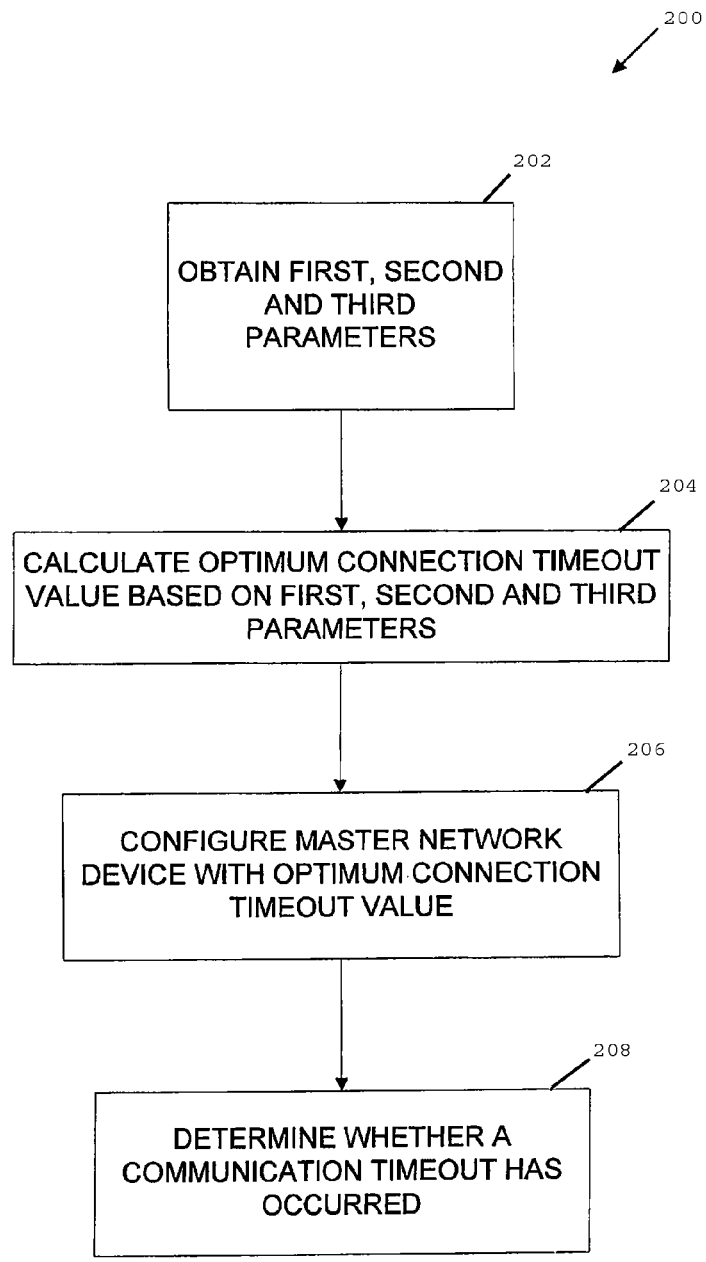
FIG. 2 is a flow diagram of one example of a method of determining a communication timeout value for the communication network of FIG. 1 in accordance with one embodiment.

FIG. 2 is a flow diagram of one example process 200 for determining a timeout value for the communication network 100, which may include a master network device. At block 202, the first, second and third parameters R, P and D are obtained. For example, the parameters R, P and D may be obtained from the master network device and/or manual user entry by the configuration tool 116 of FIG. 1. At block 204, a connection timeout value is calculated based on the first, second and third parameters R, P and D. For example, the connection timeout value may be calculated to be a value greater than or equal to the sum of the first, second and third parameters R, P and D (e.g., $T >= R+P+D$).

At block 206, the master network device is configured with the connection timeout value calculated in block 204. The configuration of the master network device may include, for example, programming the timeout value into the master network device using the configuration tool 116 (e.g., during an upload of a ladder logic program into a PLC from the programming tool) or other programming device.

At block 208, the master network device and/or other devices on the network use the connection timeout value to determine whether a communication timeout has occurred. For example, if a data packet is not received by one of the devices on the network within the amount of time specified by the connection timeout value, the device may declare a communication timeout event. Depending on the configuration of the network, one or more of the devices may respond to the communication timeout event by attempting to resend the undelivered data packet and/or reconfiguring the I/O communication link to use a different communication path within the network for sending and receiving subsequent data packets.

Various embodiments may be implemented on one or more computer systems. For example, the configuration tool 116 of FIG. 1 may be implemented in a single computer system or in multiple computer systems. These computer systems may be, for example, general-purpose computers such as those based on Intel PENTIUM-type processor, Motorola PowerPC, Sun UltraSPARC, Hewlett-Packard PA-RISC processors, or any other type of processor.

Figure 3:
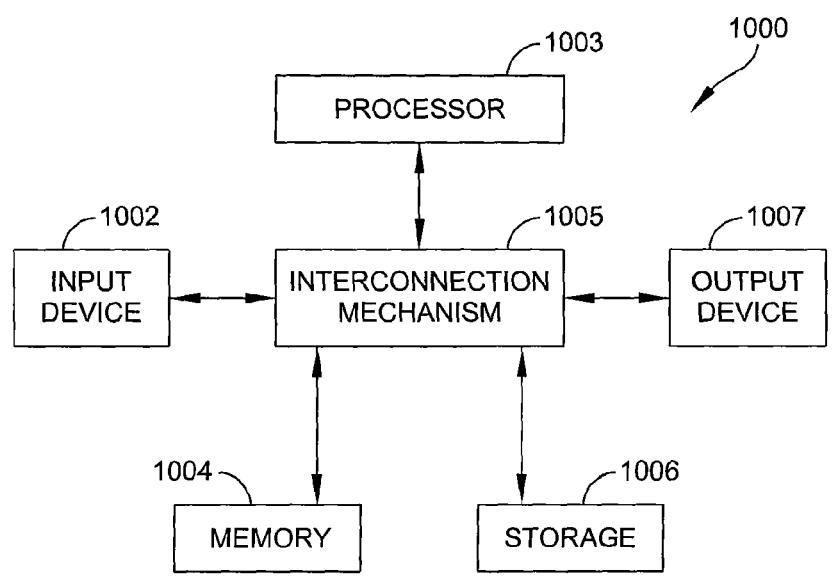
FIG. 3 is a functional block diagram of a computer system in accordance with one embodiment.

For example, various aspects may be implemented as specialized software executing in a general-purpose computer system 1000 such as that shown in FIG. 3. The computer system 1000 may include a processor 1003 connected to one or more memory devices 1004, such as a disk drive, memory, or other device for storing data. Memory 1004 is typically used for storing programs and data during operation of the computer system 1000. The computer system 1000 may also include a storage system 1006 that provides additional storage capacity. Components of computer system 1000 may be coupled by an interconnection mechanism 1005, which may include one or more busses (e.g., between components that are integrated within a same machine) and/or a network (e.g., between components that reside on separate discrete machines). The interconnection mechanism 1005 enables communications (e.g., data, instructions) to be exchanged between system components of system 1000.

Computer system 1000 also includes one or more input devices 1002, for example, a keyboard, mouse, trackball, microphone, touch screen, and one or more output devices 1007, for example, a printing device, display screen, speaker. In addition, computer system 1000 may contain one or more interfaces (not shown) that connect computer system 1000 to a communication network (in addition or as an alternative to the interconnection mechanism 1005).

Figure 4:
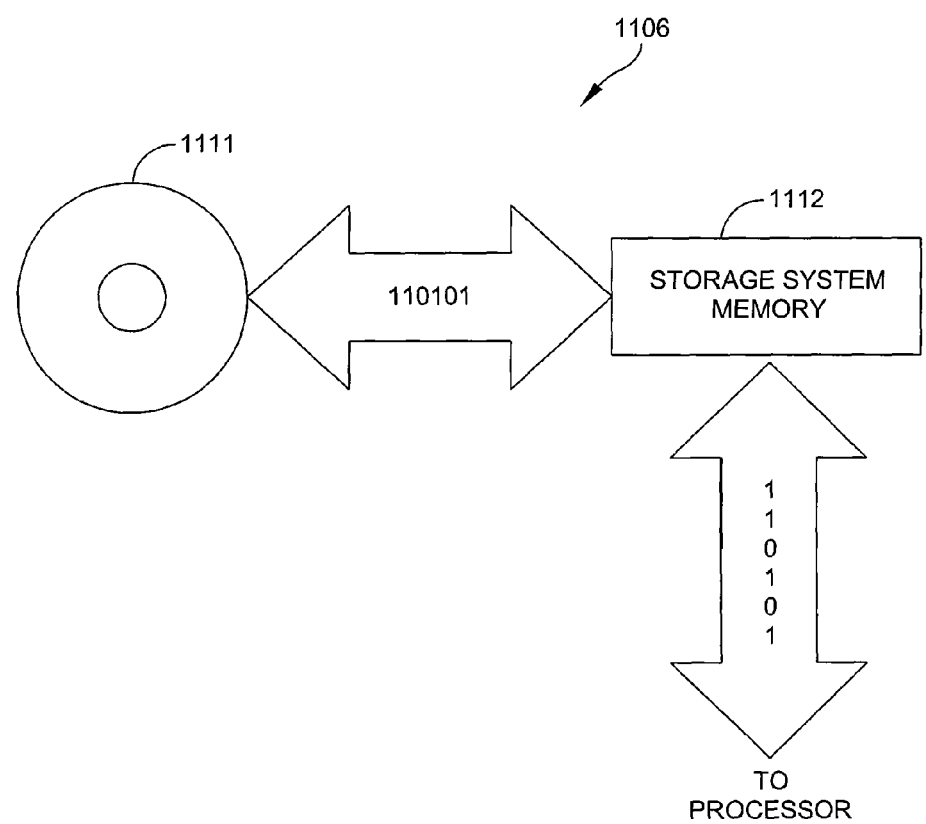
FIG. 4 is a functional block diagram of a storage system that may be used with the computer system of FIG. 3.

The storage system 1006, shown in greater detail in FIG. 4, typically includes a computer readable and writeable nonvolatile recording medium 1111 in which signals are stored that define a program to be executed by the processor or information stored on or in the medium 1111 to be processed by the program to perform one or more functions associated with embodiments described herein. The medium may, for example, be a disk or flash memory. Typically, in operation, the processor causes data to be read from the nonvolatile recording medium 1111 into another memory 1112 that allows for faster access to the information by the processor than does the medium 1111. This memory 1112 is typically a volatile, random access memory such as a dynamic random access memory (DRAM) or static memory (SRAM). It may be located in storage system 1106, as shown, or in memory system 1004. The processor 1003 generally manipulates the data within the integrated circuit memory 1004,1112 and then copies the data to the medium 1111 after processing is completed. A variety of mechanisms are known for managing data movement between the medium 1111 and the integrated circuit memory element 1004, 1112, and the invention is not limited thereto. The invention is not limited to a particular memory system 1004 or storage system 1006.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1000 is shown by way of example as one type of computer system upon which various aspects of the invention may be practiced, it should be appreciated that aspects of the invention are not limited to being implemented on the computer system as shown in FIG. 3. Various aspects of the invention may be practiced on one or more computers having a different architecture or components shown in FIG. 3. Further, where functions or processes of embodiments of the invention are described herein (or in the claims) as being performed on a processor or controller, such description is intended to include systems that use more than one processor or controller to perform the functions.

Computer system 1000 may be a general-purpose computer system that is programmable using a high-level computer programming language. Computer system 1000 may be also implemented using specially programmed, special purpose hardware. In computer system 1000, processor 1003 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP or Vista operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that embodiments of the invention are not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present invention.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or Q (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method of configuring a communication network including a network device, the method comprising:
   obtaining, by a configuration device operatively coupled to the network device, a first parameter associated with a predetermined topological characteristic of the communication network;
   obtaining, by the configuration device, a second parameter associated with a communication protocol of the communication network;
   obtaining, by the configuration device, a third parameter associated with a performance characteristic of the communication network;
   calculating, by the configuration device, a connection timeout value based on the first parameter, the second parameter and the third parameter; and
   programming the network device with the connection timeout value using the configuration device,
   wherein the network device is configured to determine whether a communication timeout has occurred on the communication network based on the connection timeout value.

2. The method of claim 1, wherein calculating the connection timeout value includes calculating a sum of the first parameter, the second parameter and the third parameter.

3. The method of claim 2, wherein the first parameter includes a predetermined worst-case network recovery time of the communication network.

4. The method of claim 3, wherein the first parameter is 50 milliseconds.

5. The method of claim 3, wherein the second parameter includes a maximum data packet time interval of the communication network.

6. The method of claim 5, wherein the second parameter includes one of a requested packet interval and an actual packet interval.

7. The method of claim 5, wherein the network device is a master network device, and wherein the third parameter includes a worst-case communication latency between the master network device and a slave network device operatively coupled to the master network device through the communication network.

8. The method of claim 7, wherein the third parameter includes a combination of a queuing delay time of the communication network, a propagation delay time of the communication network and a processing delay time of the communication network.

9. The method of claim 1, wherein the network device is a master network device, and wherein the method further comprises programming the master network device to establish at least one I/O connection, using the connection timeout value, with a slave network device operatively coupled to the master network device through the communication network.

10. A network management system comprising:
a network device configured to be operatively coupled to a communication network; and
a configuration device operatively coupled to the network device, the configuration device being configured to:
obtain a first parameter associated with a predetermined topological characteristic of the communication network;
obtain a second parameter associated with a communication protocol of the communication network;
obtain a third parameter associated with a performance characteristic of the communication network;
calculate a connection timeout value based on the first parameter, the second parameter and the third parameter; and
program the network device with the connection timeout value,
wherein the network device is configured to determine whether a communication timeout has occurred on the communication network based on the connection timeout value.

11. The network management system of claim 10, wherein the configuration device is further configured to calculate the connection timeout value by calculating a sum of the first parameter, the second parameter and the third parameter.

12. The network management system of claim 11, wherein the first parameter includes a predetermined worst-case network recovery time of the communication network.

13. The network management system of claim 12, wherein the first parameter is 50 milliseconds.

14. The network management system of claim 12, wherein the second parameter includes a maximum data packet time interval of the communication network.

15. The network management system of claim 14, wherein the second parameter includes one of a requested packet interval and an actual packet interval.

16. The network management system of claim 14, wherein the network device is a master network device and wherein the third parameter includes a worst-case communication latency between the master network device and a slave network device operatively coupled to the master network device through the communication network.

17. The network management system of claim 16, wherein the third parameter includes a combination of a queuing delay time of the communication network, a propagation delay time of the communication network and a processing delay time of the communication network.

18. The network management system of claim 10, wherein the network device is a master network device, and wherein the configuration device is further configured to program the master network device to establish at least one I/O connection, using the connection timeout value, with a slave network device operatively coupled to the master network device through the communication network.

19. A non-transitory computer readable medium having stored thereon sequences of instructions including instructions that will cause a processor to:
obtain a first parameter associated with a predetermined topological characteristic of the communication network;
obtain a second parameter associated with a communication protocol of the communication network;
obtain a third parameter associated with a performance characteristic of the communication network;
calculate a connection timeout value based on the first parameter, the second parameter and the third parameter; and
program a network device operatively coupled to the processor with the connection timeout value using the configuration device,
wherein the network device is configured to determine whether a communication timeout has occurred on the communication network based on the connection timeout value.

20. The non-transitory computer readable medium of claim 19, further including an instruction that will cause the processor to calculate the connection timeout value by calculating a sum of the first parameter, the second parameter and the third parameter.

* * * * *